United States Patent
Gilbert-Schachter et al.

(10) Patent No.: US 8,339,472 B2
(45) Date of Patent: Dec. 25, 2012

(54) COMPOSITE FLASH FOR A MOBILE DEVICE

(75) Inventors: Yochanan Cliel Manoach Gilbert-Schachter, Waterloo (CA); Marc Drader, Waterloo (CA)

(73) Assignee: Research In Motion Limited, Waterloo (CA)

( * ) Notice: Subject to any disclaimer, the term of this patent is extended or adjusted under 35 U.S.C. 154(b) by 391 days.

(21) Appl. No.: 12/789,739

(22) Filed: May 28, 2010

(65) Prior Publication Data

US 2011/0292239 A1    Dec. 1, 2011

(51) Int. Cl.
*H04N 9/73* (2006.01)
*H04N 5/222* (2006.01)
*G03B 15/02* (2006.01)
*G03B 9/02* (2006.01)
*G06K 9/00* (2006.01)

(52) U.S. Cl. ....... 348/224.1; 348/371; 396/61; 396/505; 382/167

(58) Field of Classification Search ............... 348/223.1, 348/224.1, 655, 371; 358/516; 382/167; 396/61–62, 106–110, 155–206
See application file for complete search history.

(56) References Cited

U.S. PATENT DOCUMENTS

| | | |
|---|---|---|
| 2005/0400773 | 2/2005 | Lebens Gary |
| 2005/0099798 A1 | 5/2005 | Cugini et al. |
| 2006/0198137 A1 * | 9/2006 | Lee et al. ..................... 362/231 |
| 2007/0139920 A1 * | 6/2007 | Van De Ven et al. ......... 362/235 |
| 2008/0075447 A1 * | 3/2008 | Wernersson .................. 396/155 |
| 2008/0180544 A1 * | 7/2008 | Drader et al. .............. 348/223.1 |
| 2009/0243493 A1 * | 10/2009 | Bergquist ..................... 315/149 |

FOREIGN PATENT DOCUMENTS

| | | |
|---|---|---|
| EP | 1950977 A1 | 7/2008 |
| GB | 2409287 A | 6/2005 |
| WO | 2007096814 A1 | 8/2007 |
| WO | 2008035234 A1 | 3/2008 |

OTHER PUBLICATIONS

Extended European Search report mailed Sep. 30, 2010. In corresponding application No. 10164365.8.
Examination Report mailed Mar. 3, 2011. In corresponding application No. 10164365.8.
Summons to attend oral proceedings pursuant to rule 115(1) EPC mailed Aug. 5, 2011. In corresponding application No. 10164365.8.

* cited by examiner

*Primary Examiner* — Aung S Moe
*Assistant Examiner* — Mekonnen Dagnew
(74) *Attorney, Agent, or Firm* — Novak Druce + Quigg LLP

(57) ABSTRACT

An apparatus and method for capturing an image on a mobile device having a flash comprising a red light source and a white light source is presented herein. A detection of a color spectrum of ambient light is made using image data sensed by an image sensor. Additionally, a determination of an intensity of red light when combined with an associated intensity of white light results in a color spectrum that substantially matches the color spectrum of the ambient light. The flash emits white light from the white light source of the flash and red light from the red light source of the flash. An image from a camera module is recorded during the emission of the white and red light.

18 Claims, 5 Drawing Sheets

COMPOSITE FLASH FOR A MOBILE DEVICE

FIELD OF TECHNOLOGY

The present disclosure relates generally to mobile devices having a camera and an associated flash. More specifically, the present disclosure relates to controlling the flash on the mobile device.

BACKGROUND

With the advent of more robust electronic systems, advancements of mobile devices are becoming more prevalent. Mobile devices can provide a variety of functions including, for example, telephonic, audio/video, and gaming functions. Mobile devices can include mobile stations such as cellular telephones, smart telephones, portable gaming systems, portable audio and video players, electronic writing or typing tablets, handheld messaging devices, personal digital assistants, cameras, video cameras, and handheld computers.

Mobile devices allow users to have an integrated device which can perform a variety of different tasks. For example, a mobile device can be enabled for voice transmission (cell phones), text transmission (pagers and PDAs), sending and receiving data for viewing of Internet websites, multi-media messages, videography and photography. While some mobile devices may include voice transmission (cell phones), text transmission (pagers and PDAs), sending and receiving data for viewing of Internet websites, multi-media messages, videography and photography functions, other devices can be limited to just a sub-set of voice transmission (cell phones), text transmission (pagers and PDAs), sending and receiving data for viewing of Internet websites, multi-media messages, videography and photography functions. When enabled for videography or photography or a combination thereof, the mobile device can be equipped with a flash. In some mobile devices, the flash is limited to use with photography and in others the flash can be used in videography too.

BRIEF DESCRIPTION OF THE DRAWINGS

Implementations of the present application will now be described, by way of example only, with reference to the attached Figures, wherein.

DETAILED DESCRIPTION

Figure 1:
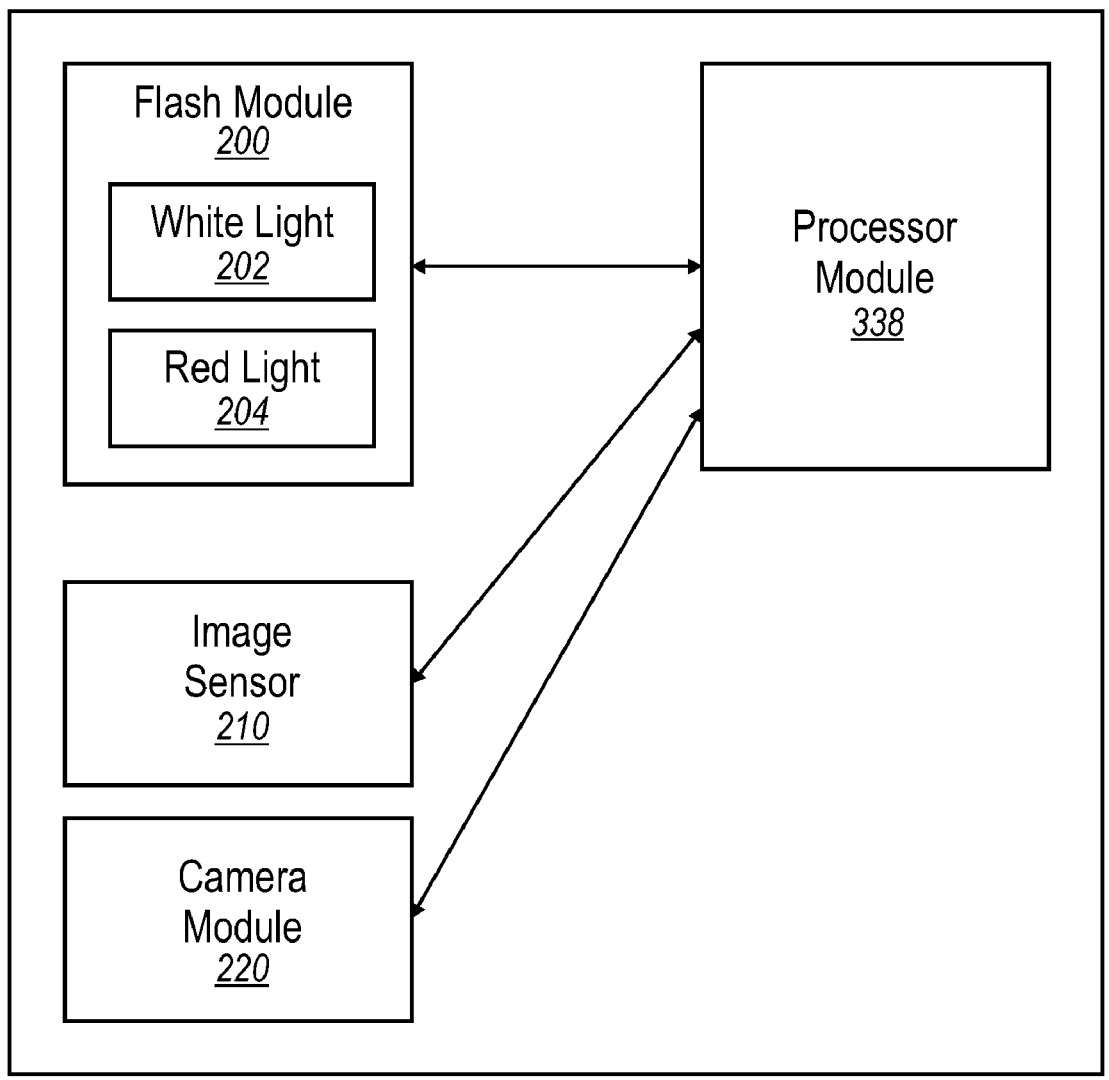
FIG. 1 is a flow diagram of a mobile device having a flash module in accordance with an exemplary implementation according to the present disclosure.

As will be appreciated for simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without the described specific details. In other instances, methods, procedures and components have not been described in detail so as not to obscure the related relevant feature being described. Also, the description is not to be considered as limiting the scope of the implementations described herein.

Several definitions that apply throughout this document will now be presented. The word "coupled" is defined as connected, whether directly or indirectly through intervening components and is not necessarily limited to physical connections. The term "mobile device" is defined as any electronic device that is capable of at least accepting information entries or commands from a user and includes the electronic device's own power source. The term "light source" is defined as at least one device capable of emitting light. In at least one implementation a light source can include a multiple number of devices capable of emitting light. The term "flash" as used herein can be either a pulse of light during image capture or a continuous light provided during image capture. Additionally, the word flash can be used to refer to the module that is capable of producing a flash, when the term is used as a noun. Further definitions will be presented below.

The following figures describe a flash module for a mobile device. The "flash module" can be included within the mobile device or provided separately from the mobile device. Furthermore, the flash module can include one or more components for emission of light for illumination of a subject. The flash for the mobile device as presented herein has at least two light sources capable of producing a composite light. In at least one implementation, the flash module includes at least one light source that is a red light source. The red light source can be one or more red light emitting diodes (LEDs), a white LED filtered so that only the red light wavelength is emitted, or any other light configured with or without a filter. Additionally, a white light source can be provided as well. The white light source can be at least one white LED, a xenon tube, or other light source capable of emitting a broad spectrum of light.

A typical flash on a mobile device is single light source that has a color spectrum that matches a single type of ambient light. However, mobile devices are used in a variety of ambient lighting conditions. While the white light source is generally described as a white light source, the variation between different types of white light sources creates a color balance problem in that the white light from the flash which typically can only match a single type of light source for example an incandescent light. As mobile devices are used to capture images under a variety of ambient lighting conditions the color spectrum of the flash will not match the variety of ambient lighting conditions. For example, if the flash has a color spectrum that matches that of an incandescent light the flash will not perform well in a fluorescent lighting condition. The difference between the color spectrum of the flash and the ambient light causes the subject of a photograph or a video appear to have a color which is different in the recorded image(s) as compared to colors normally perceived by an observer. In one implementation, the present disclosure provides a white light source and a red light source to compensate for this difference and to better match the light with two light sources. When the white light source and the red light source are combined, the resulting emitted light can more closely approximate the color balance of the ambient light emitted from an ambient light source.

In at least one implementation, the present disclosure provides a method of emitting an intensity from a first light and a second light to substantially match the color spectrum of the ambient light. A determination of an intensity of a first light when combined with a second light is made such that the resulting color spectrum of the combined first and second light sources substantially matches the color spectrum of the ambient light. The ambient light can be sensed using a specialized sensor such as an image sensor, or the ambient light can be based on data received by a camera module. The first light and second light, as described herein, are a white light and a red light respectively. When the spectrums of the white light and red light combine, as described herein, the spectrum of the ambient light can be substantially matched. Other combinations of lights that can produce the desired-spectrum-matching characteristics are considered within the scope of this disclosure.

Once a determination is made in regards to the desired intensity of at least the second light, a transmission of light from the first light and second light is made to produce a flash. In order to correctly set the intensity of the second light, flash control data is sent to the second light source to control the intensity of the second light based on the predetermined intensity. The intensity of the first light can be a predetermined amount or intensity of the first light can be adjusted in light of the ambient color spectrum. While reference herein is to individual lights, this disclosure contemplates the incorporation of the lights within a flash module. Additionally, the flash module can include capacitors, inductors, transformers and other electronic circuitry necessary to produce a flash of a desired intensity. The capacitors, inductors, transformers and other electronic circuitry components are omitted from the description herein for clarity. Additionally, the data that is transmitted to the first light and the second light can be combined into a single data set and transmitted to a flash module that includes both the first and second lights. Additional detail concerning the individual components and production of the flash are described below.

An exemplary flow diagram of a mobile device 100 according to the present disclosure is illustrated in FIG. 1. As mentioned above, several components of the mobile device 100 have been omitted for clarity. Some of the omitted components are presented later in regards to FIG. 2. As illustrated in FIG. 1, a processing module 338 is included which is coupled to a flash module 200, an image sensor 210, and a camera module 220. The processing module 338 is configured to at least send data to the flash module 200. In the illustrated implementation, the flash module 200 is configured for two way data transmission and reception with the processing module 338. This two-way data transmission and reception allows for data to flow between the flash module 200 and the processing module 338. For example, the processing module 338 can send control data to the flash module 200 to control the flash module. This data can include instruction for controlling the flash from a white light source 202. In at least one implementation, the white light source 202 is a single LED. In other implementations, a plurality of LEDs can be implemented. The white light source 202 can be located within the flash module 200, and the flash module 200 can provide instructions to the white light source 202. In an implementation, where the white light source 202 is located in an individual module, the control data can pass through one or more controllers which can be processors or the like for providing the final instruction to the white light source 202.

Likewise, the red light source 204 can be located in the flash module 200. When the red light source 204 is located within the flash module 200, control data for controlling the red light source 204 is sent to the flash module 200, which can process or further transmit the data to the red light source 204. In at least one implementation, the red light source 204 can have an integrated controller. In other implementations, the flash module 200 controls the red light source 204 by controlling the power supplied to the red light source 204. The red light source 204 can be an individually configured device that is either separate from or included with the flash module 200. In at least one implementation, the red light source 204 and white light source 202 are provided individually without being a part of the flash module 200.

Figure 2:
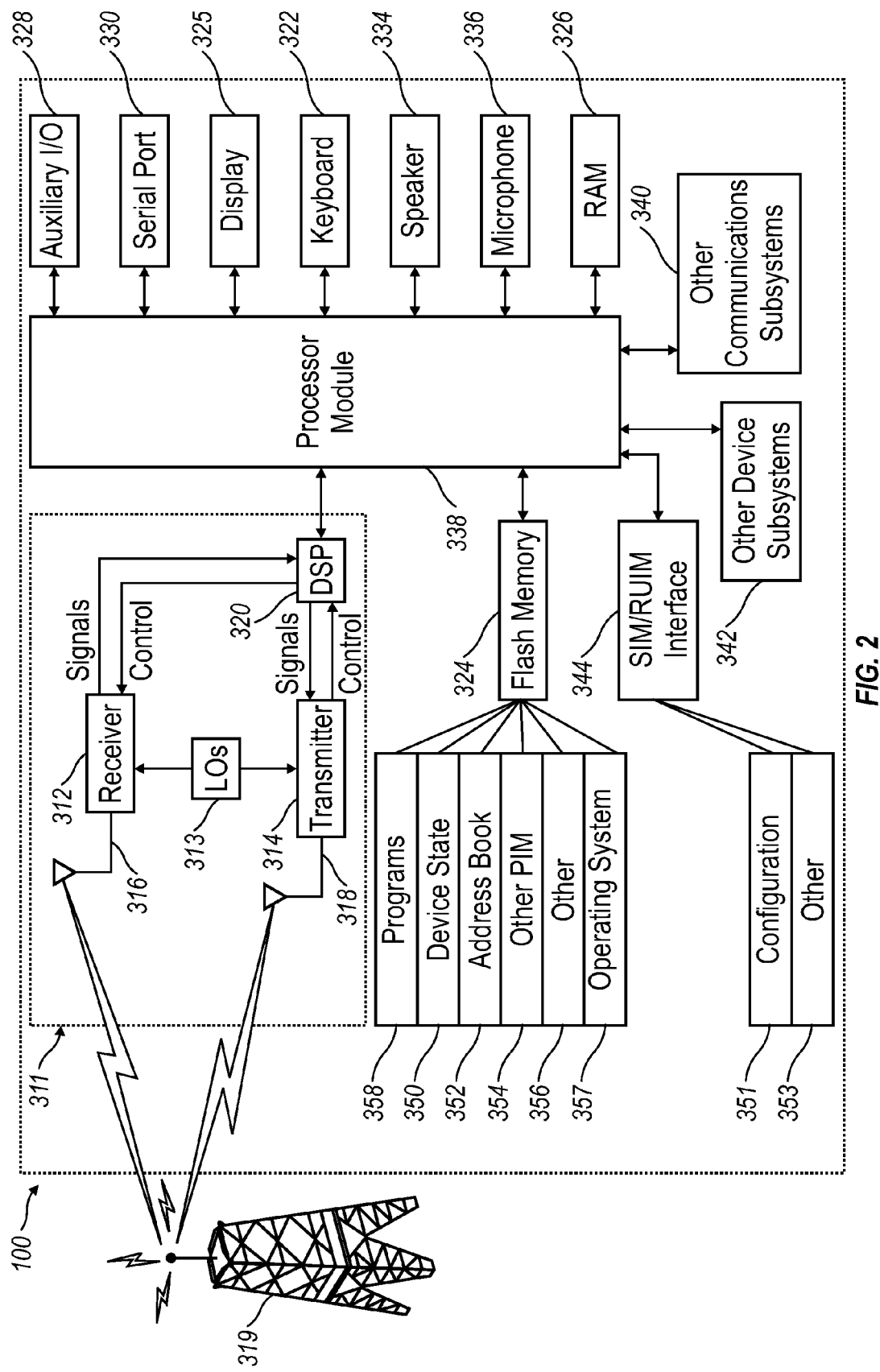
FIG. 2 is a block diagram representing a mobile device in accordance with an exemplary implementation interacting with a communication network.

An image sensor 210 can be included within the mobile device 100. When the image sensor 210 is included, the image sensor 210 receives image data. The image data that the image sensor 210 can sense includes ambient light characteristics. In at least one implementation, the image sensor 210 can also detect at least one of a distance to an object of interest and backlighting. As illustrated in FIG. 2, the image sensor 210 is shown separate from the camera module 220. In other implementation the image sensor 210 can be included in the camera module 220. Additionally, the same sensor can be used in the camera module 220 as described herein in relation to the image sensor 210 and in relation to capturing the image of the objects in view of the sensor. In one implementation, when the same sensor is used for both functions, the sensor can operate at a lower power setting for acquisition of ambient light characteristics as compared to image acquisition of the objects within view of the sensor. In other implementations, the sensor can be fully powered in both functions.

Additionally, in at least one implementation, the camera module 220 can sample a plurality of image data received by the image sensor 210. The image data can be analyzed by the processor module 338. For example, a sample of ten different images can be taken by the camera module 220 and analyzed by the processor module 338. In one implementation, the ambient light characteristics are determined based upon the average image data received. In another implementation, the ambient light characteristics are determined based upon median image data. In another implementation, the number of samples can be varied and compared with another set of data taken a predetermined period of time before. This analysis can be completed in under one second.

In addition to the above components, the mobile device 100 can include additional components as illustrated in FIG. 2. While the components of FIGS. 1 and 2 are not all inclusive, FIGS. 1 and 2 illustrate components that can be included on a mobile device 100 according to the present disclosure. Additional components are required to allow the mobile device 100 to function, but have been omitted for clarity.

As illustrated in FIG. 2, the mobile device 100 includes a communication subsystem 311 to perform all communication transmission and reception with a wireless network 319. A processor module 338 can be connected with an auxiliary input/output (I/O) subsystem 328 which can be connected to the mobile device 100. The processor module 338 can include one or more processors. Additionally, the processors can be micro-processors for example. In at least one implementation, the processor module 338 can be connected to a serial port (for example, a Universal Serial Bus port) 330 which can allow for communication with other devices or systems. The display 325 can be connected to the processor module 338 to allow for displaying of information to an operator of the mobile device 100. When the mobile device 100 is equipped with a keyboard 322, the keyboard 322 can also be connected with the processor module 338. The mobile device 100 can include a speaker 334, a microphone 336, random access memory (RAM) 326, and flash memory 324, all of which can be connected to the processor module 338. Other similar components can be provided on the mobile device 100 as well and optionally connected to the processor module 338. Other communication subsystems 340 and other communication device subsystems 342 are generally indicated as being functionally connected with the processor module 338 as well. An example of the communication subsystem 340 is that of a short range communication system such as BLUETOOTH® communication module or a WI-FI® communication module (a communication module in compliance with IEEE 802.11 set of protocols) and associated circuits and components. The processor module 338 is able to perform operating system functions and enables execution of programs on the mobile device 100. In some implementations not all of the above components can be included in the mobile device 100.

Figure 5:
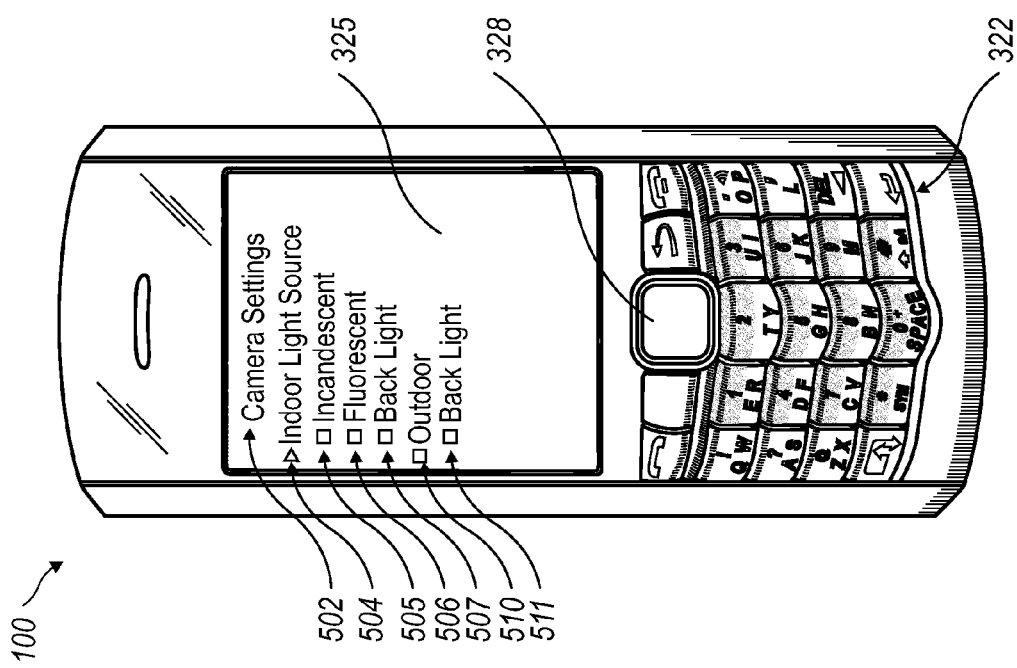
FIG. 5 is a front view of a mobile device illustrating an exemplary menu of camera settings according to an exemplary implementation of the present disclosure.

The auxiliary I/O subsystem 328 can take the form of a trackpad navigation tool as illustrated in the exemplary implementation shown in FIG. 5, or a trackball, a thumbwheel, a navigation pad, a joystick, touch-sensitive interface, or other I/O interface. While the above examples have been provided in relation to the auxiliary I/O subsystem 328, other subsystems capable of providing input or receiving output from the mobile device 100 are considered within the scope of this disclosure. Other keys can be placed along the side of the mobile device 100 to function as escape keys, volume control keys, scrolling keys, power switches, or user programmable keys, and can likewise be programmed accordingly.

Furthermore, the mobile device 100 is equipped with components to enable operation of various programs, as shown in FIG. 2. In an exemplary implementation, the flash memory 324 is enabled to provide a storage location for the operating system 357, device programs 358, and data. The operating system 357 is generally configured to manage other programs 358 that are also stored in memory 324 and executable on the processor. The operating system 357 honors requests for services made by programs 358 through predefined program 358 interfaces. More specifically, the operating system 357 typically determines the order in which multiple programs 358 are executed on the processor and the execution time allotted for each program 358, manages the sharing of memory 324 among multiple programs 358, handles input and output to and from other device subsystems 342, and so on. In addition, operators can typically interact directly with the operating system 357 through a user interface which can include the keyboard 322 and display screen 325. While in an exemplary implementation the operating system 357 is stored in flash memory 324, the operating system 357 in other implementations is stored in read-only memory (ROM) or similar storage element (not shown). As those skilled in the art will appreciate, the operating system 357, device program 358 or parts thereof can be loaded in RAM 326 or other volatile memory.

In one exemplary implementation, the flash memory 324 contains programs 358 for execution on the mobile device 100 including an address book 352, a personal information manager (PIM) 354, and the device state 350. Furthermore, programs 358 and other information 356 including data can be segregated upon storage in the flash memory 324 of the mobile device 100.

When the mobile device 100 is enabled for two-way communication within the wireless communication network 319, the mobile device 100 can send and receive messages from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 800 can require a unique identifier to enable the communication device 900 to transmit and receive messages from the communication network 319. Other systems may not require such identifying information. GPRS, UMTS, and EDGE use a Subscriber Identity Module (SIM) in order to allow communication with the communication network 319. Likewise, most CDMA systems use a Removable User Identity Module (RUIM) in order to communicate with the CDMA network. The RUIM and SIM card can be used in multiple different mobile devices 100. The mobile device 100 can be able to operate some features without a SIM/RUIM card, but the mobile device 100 will not be able to communicate with the network 319. A SIM/RUIM interface 344 located within the mobile device 100 allows for removal or insertion of a SIM/RUIM card (not shown). The SIM/RUIM card features memory and holds key configurations 351, and other information 353 such as identification and subscriber related information. With a properly enabled mobile device 100, two-way communication between the mobile device 100 and communication network 319 is possible.

If the mobile device 100 is enabled as described above or the communication network 319 does not require such enablement, the two-way communication enabled mobile device 100 is able to both transmit and receive information from the communication network 319. The transfer of communication can be from the mobile device 100 or to the mobile device 100. In order to communicate with the communication network 319, the mobile device 100 in the presently described exemplary implementation is equipped with an integral or internal antenna 318 for transmitting messages to the communication network 319. Likewise the mobile device 100 in the presently described exemplary implementation is equipped with another antenna 316 for receiving communication from the communication network 319. The antennae (316, 318) in another exemplary implementation are combined into a single antenna (not shown). As one skilled in the art would appreciate, the antenna or antennae (316, 318) in another implementation are externally mounted on the mobile device 100.

When equipped for two-way communication, the mobile device 100 features the communication subsystem 311. As is understood in the art, the communication subsystem 311 is modified so that the communication subsystem 311 can support the operational needs of the mobile device 100. The subsystem 311 includes a transmitter 314 and receiver 312 including the associated antenna or antennae (316, 318) as described above, local oscillators (LOs) 313, and a processing module which in the presently described exemplary implementation is a digital signal processor (DSP) 320.

The present disclosure contemplates that communication by the mobile device 100 with the wireless network 319 can be any type of communication that both the wireless network 319 and mobile device 100 are enabled to transmit, receive and process. In general, the communications can be classified as voice and data. Voice communication generally refers to communication in which messages for audible sounds are transmitted by the mobile device 100 through the communication network 319. Data generally refers to all other types of communication that the mobile device 100 is capable of performing within the constraints of the wireless network 319.

Example device programs that can depend on such data include email, contacts and calendars. For each such program, synchronization with home-based versions of the programs can be desirable for either or both of their long term and short term utility. As an example, emails are often time sensitive, so substantially real time synchronization can be desired. Contacts, on the other hand, can be usually updated less frequently without inconvenience. Therefore, the utility of the mobile device 100 is enhanced when connectable within a communication system, and when connectable on a wireless basis in the network 319 in which voice, text messaging, and other data transfer are accommodated.

Figure 3:
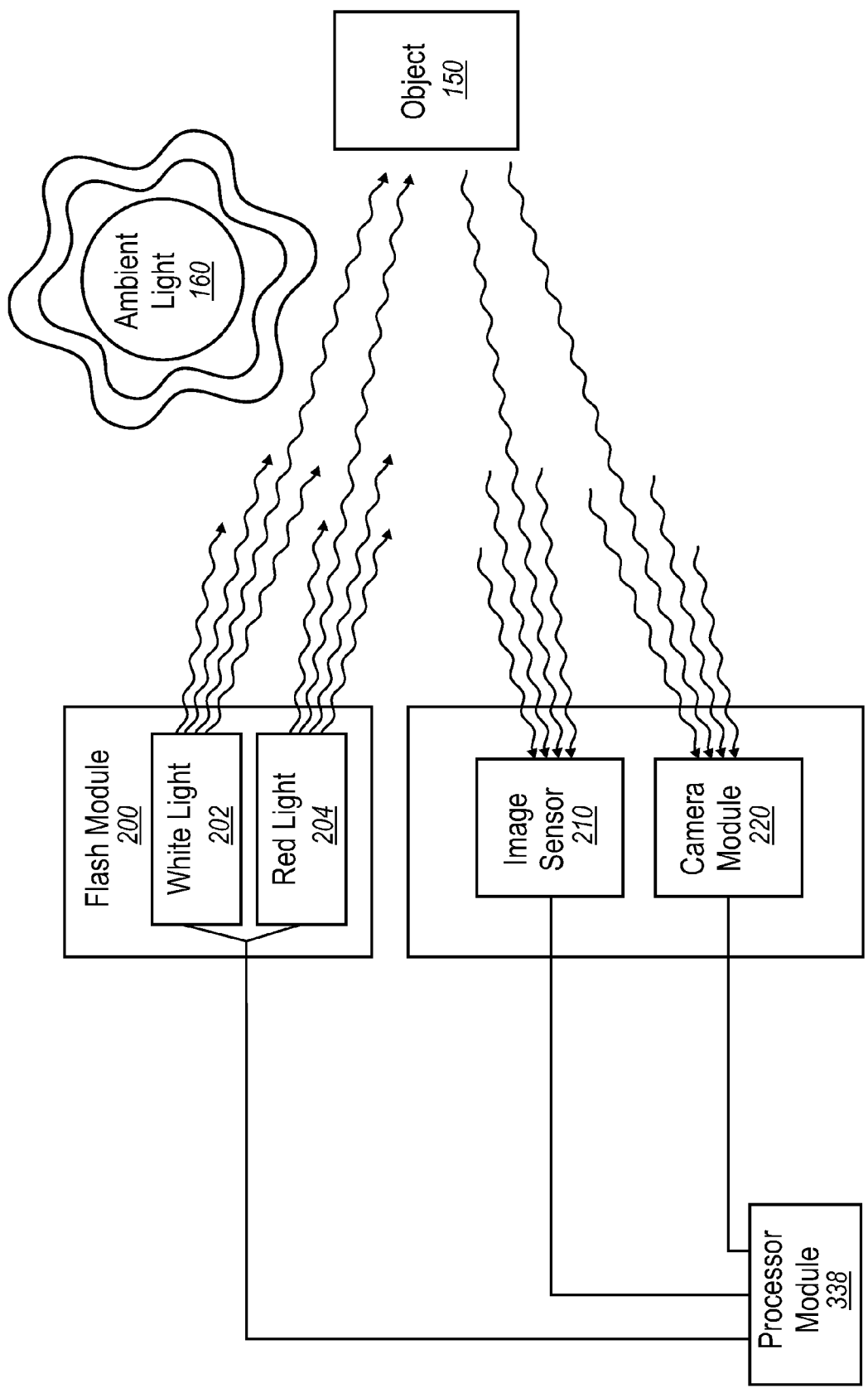
FIG. 3 is a block diagram of an exemplary device that is adapted to determine an intensity of red light in accordance with an exemplary implementation according to the present disclosure.

FIG. 3 illustrates on example of a mobile device 100 that is adapted to determine an intensity of red light when combined with white light results in a color spectrum that substantially matches a color spectrum of an ambient light. Additionally as illustrated, the mobile device 100 (not shown) emits red light with the determined intensity and white light. As illustrated, the object 150 of interest is illuminated by ambient light 160. The type of ambient light 160 can cause the object 150 to appear to an observer as having different colors. For example, the ambient light 160 can be a fluorescent light, an incandescent light, a light emitting diode light, a sodium-vapor light, a mercury vapor light, and the like. Each of the fluorescent light, incandescent light, light emitting diode light, sodium-vapor light, mercury vapor lights types of lights emits a slightly different color spectrum of light so that when the emitted ambient light 160 reflects off of the object 150 an observer will believe that the color of the object 150 is different. Furthermore, when a flash of light is emitted from the flash module 200, the object 150 can be illuminated so that portions of the object 150 are illuminated by: the combination of the light from the flash module 200 and ambient light; predominantly the light from the flash module 200; or predominantly from the ambient light 160. For example, the placement of the ambient light 160 and flash module 200 relative to the object 150 and each other can cause the illumination of different portions of the object 150 to cause a viewable color shift.

The present disclosure provides an image sensor 210 that is adapted to detect a color spectrum of ambient light 160. As described above the image sensor 210 can receive reflected light off of the object or objects within the view of image sensor 210. The data detected by image sensor 210 can include ambient light characteristics such as ambient light color spectrum data. In at least one implementation, the image sensor 210 can also measure luminous intensity. The data received at the image sensor 210 is processed by the processor module 338. The processor module 338 can be the main processor module or the processor module 338 can be a specialized processor module. Additionally, the image sensor data can be pre-processed or processed in advance of the processor module 338.

As illustrated, the processor module 338 is coupled to the white light source 202, red light source 204, image sensor 210 and a camera module 220. The processor module 338 can be adapted to receive color spectrum data from the image sensor 210. The processor module 338 can also determine an intensity of red light that substantially matches a color spectrum of the ambient light 160 when combined with a white light. In at least one implementation, the processor module 338 can also determine an intensity of red light and white light that in combination substantially matches the color spectrum of ambient light 160. The processor module 338 transmits red light flash control data to the red light source 204 to control the emission of the intensity of the red light. The red light flash control data is based on the determined intensity of red light. Additionally, the processor module transmits white light flash control data to the white light source 202 to control the emission of the intensity of the white light. The white light flash control data can be based on the determined intensity of red light. In at least one implementation, the control data for both the red light source 204 and white light source 202 can be determined based upon a calculated intensity for both the red light and white light combination to substantially match the color spectrum of the ambient light 160.

As illustrated the flash module 200 includes the white light source 202 and red light source 204. As indicated above, the white light source 202 and red light source 204 are provided as examples and other light sources can be used. Once the control data for the respective light source is received, the flash module 200 or the light source itself can control the emission of light therefrom. For example, the white light source 202 emits white light and the red light source 204 emits red light.

In at least one implementation, the processor module 338 can transmit filter control data based upon the detected color spectrum of the ambient light 160 to the camera module 220 to adjust filter settings on the camera module 220. The adjustment of filter settings on the camera module 220 allows for the camera module 220 to correct the image color as received so as to approximate the color to a more standard color, wherein the standard color takes into consideration a light of a known spectrum. When the filter settings of the camera module 220 are adjusted according to this disclosure the image captured by the camera module 220 appears more realistic to the observer. Additionally, the processor module 338 can be adapted to transmit filter control data based upon the detected color spectrum of ambient light and the determined intensity of red light to the camera module 220 to adjust the filter settings on the camera module 220. Filter settings as used herein refer to the filtering of different portions of the spectrum of light. For example, one filter setting can be a blue filter setting, wherein the amount of blue light is reduced or eliminated as compared to the actual light received. Additionally, the filter settings can adjust several different colors relative to each other.

The camera module 220 of the mobile device 100 can be adapted to record a still image during the emission of the white light and red light. In other implementations, the camera module 220 can be adapted to record video images during the emission of the white light and red light. Some mobile devices 100 can be equipped with camera modules 220 that are capable of capturing both video and images during the emission of white light and red light.

As illustrated in FIG. 5, a menu of camera settings 502 can be provided to an operator of the mobile device 100. The menu of camera settings 502 provides for adjustment of the image processing based upon preselected options. As illustrated, there is an indoor light source option 504, incandescent light source option 505, a fluorescent light source option 505, a back light option 506, an outdoor light option 510 and an outdoor backlight option 511.

In another implementation, the menu of camera settings 502 can also include options for the operator to manually select the characteristics of the ambient light. In yet another implementation, the ambient light conditions can be selected from a plurality of known ambient light conditions.

Figure 6:
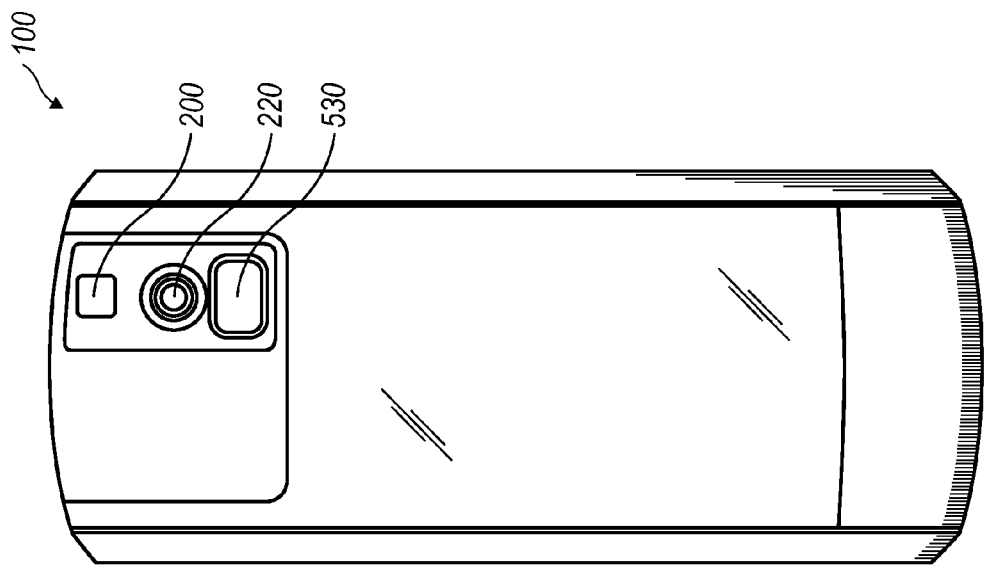
FIG. 6 is a rear view of the mobile device depicted in FIG. 5.

The backside of the mobile device 100 is illustrated in FIG. 6. As illustrated the flash module 200 is located above the camera module 220. A mirrored surface 530 is provided therebelow. In other implementations, the configuration of the flash module 200, camera module 220, and mirrored surface 530 can be located in different positions relative to one another as well as different positions on the backside of the device. In at least one implementation, the flash module 200, cameral module 220 and/or mirror 530 can be located on the front side of the mobile device.

Figure 4:
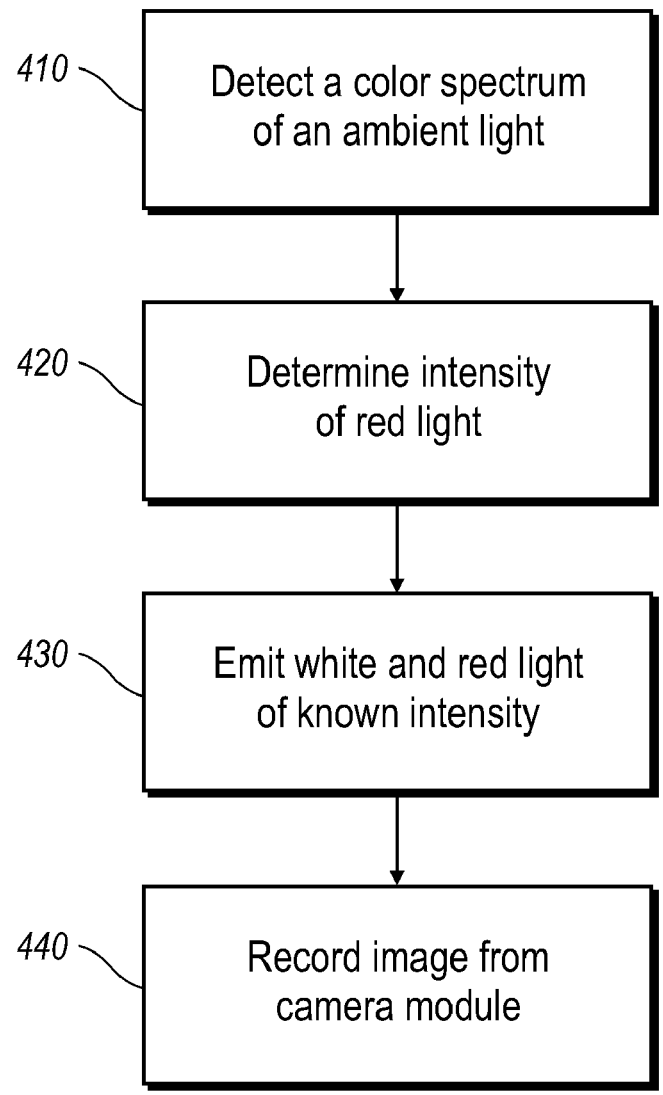
FIG. 4 is a flowchart of a method of capturing an image on a mobile device using a flash with a determined intensity of red light.

The present disclosure includes a method for capturing an image on a mobile device 100 having a flash module 200. The flash module 200 can be configured as described above. For example, the flash module 200 can include a white light source 202 and a red light source 204. The method 400 as illustrated in FIG. 4 includes detecting a color spectrum of ambient light (block 410). The detection of ambient light can be from image data sensed by an image sensor. In other implementations, the ambient light can be sensed from a camera module. The method also includes determining an intensity of red light such that when combined with an associated intensity of white light results in a color spectrum of the combination of the red light and white light that substantially matches the color spectrum of the ambient light (block 420). The method includes emitting white light of the known intensity from the white light source of the flash and emitting red light with the determined intensity of red light source of the flash (block 430). Additionally, the method includes recording an image from a camera module during the emission of the white light and red light (block 440).

In other implementations, the method can include additional or alternative steps. For example, the method can be adapted to determine an intensity of white light in addition to the determined intensity of the red light, wherein the determined intensity of the white light and the determined intensity of the red light form light with approximately the same color spectrum of the ambient light. The method can be further adapted to emit white light from the white light source based upon the determined intensity of the white light. In at least one implementation, the method can adjust filter settings on the camera module in response to the detected color spectrum of the ambient light. The filter settings can also be adjusted in response to the detected color spectrum of the ambient light and the determined intensity of the red light. Additionally, the method can include adjusting a light setting and adjusting the determined intensity of the red light based upon the received light setting. For example, the light settings can be an indoor light setting, an outdoor light setting, an incandescent light setting, a fluorescent light setting or a backlighting setting. The method can further include recording a still image during the emission of the white light and red light. Furthermore, the method can include recording video images during the emission of the white light and red light.

Exemplary implementations have been described hereinabove regarding a mobile device 100 having flash module 200 configured to be adapted based upon the ambient light. Various modifications to and departures from the disclosed implementations will occur to those having skill in the art. The subject matter that is intended to be within the spirit of this disclosure is set forth in the following claims.

What is claimed is:

1. A mobile device comprising:
    a flash module comprising a white light source adapted to emit white light having an associate intensity of white light, and a red light source adapted to emit red light having an associate intensity of red light;
    an image sensor adapted to detect a color spectrum of ambient light;
    a camera module adapted to capture an image; and
    a processing module coupled to the white light source, red light source, image sensor, and camera module;
    wherein the processing module is adapted to:
        receive color spectrum data from the image sensor;
        determine an intensity of red light that matches a color spectrum of the ambient light when combined with a white light;
        determine an intensity of the red light when combined with the associated intensity of the white light, wherein a resulting color spectrum of the combination of the red light and white light intensities substantially matches the color spectrum of the ambient light;
        transmit red light flash control data to the red light source to control emission of the intensity of the red light with the red light flash control data based on the determined intensity of red light; and
        transmit white light flash control data to the white light source to control the emission of the intensity of the white light with the white light flash control data based on the determined intensity of red light.

2. The mobile device of claim 1, wherein the processing module is further adapted to determine an intensity of a white light in addition to the determined intensity of the red light, wherein the determined intensity of the white light and the determined intensity of the red light form light with approximately the same color spectrum of the ambient light.

3. The mobile device of claim 2, wherein the processing module is adapted to transmit the white light flash control data to the white light source to control emission of the white light from the white light source based upon the determined intensity of the white light.

4. The mobile device of claim 1, wherein the processing module is adapted to transmit filter control data based upon the detected color spectrum of the ambient light to the camera module to adjust filter settings on the camera module.

5. The mobile device of claim 1, wherein the processing module is adapted to transmit filter control data based upon the detected color spectrum of the ambient light and the determined intensity of the red light to the camera module to adjust filter settings on the camera module.

6. The mobile device of claim 1, wherein the processing module is adapted to receive a light setting indication and adjust the determined intensity of the red light further based upon the received light setting indication.

7. The mobile device of claim 6, wherein the light setting indication is one of an indoor light setting, an outdoor light setting, an incandescent light setting, a fluorescent light setting, or a backlighting setting.

8. The mobile device of claim 1, wherein the camera module is further adapted to record a still image during the emission of the white and red light.

9. The mobile device of claim 1, wherein the camera module is further adapted to record video images during the emission of the white and red light.

10. A method for capturing an image on a mobile device having a flash comprising a red light source and a white light source, the method comprising:
    detecting a color spectrum of ambient light from image data sensed by an image sensor;
    determining an intensity of red light when combined with an associated intensity of a white light, wherein a resulting color spectrum of the combination of the red light and white light intensities substantially matches the color spectrum of the ambient light;
    emitting white light of the known intensity from the white light source of the flash;

emitting red light with the determined intensity from the red light source of the flash; and recording an image from a camera module during the emission of the white and red light.

11. The method of claim 10, further comprising determining an intensity of a white light in addition to the determined intensity of the red light, wherein the determined intensity of the white light and the determined intensity of the red light form light with approximately the same color spectrum of the ambient light.

12. The method of claim 11, further comprising emitting the white light from the white light source based upon the determined intensity of the white light.

13. The method of claim 10, further comprising adjusting filter settings on the camera module in response to the detected color spectrum of the ambient light.

14. The method of claim 10, further comprising adjusting filter settings of the camera module in response to the detected color spectrum of the ambient light and the determined intensity of the red light.

15. The method of claim 10, further comprising receiving a light setting indication and adjusting the determined intensity of the red light further based upon the received light setting indication.

16. The method of claim 15, wherein the light setting indication is one of an indoor light setting, an outdoor light setting, an incandescent light setting, a fluorescent light setting, or a backlighting setting.

17. The method of claim 10, further comprising recording a still image during the emission of the white and red light.

18. The method of claim 10, further comprising recording video images during the emission of the white and red light.

* * * * *